US010242267B2

(12) United States Patent
Fan et al.

(10) Patent No.: US 10,242,267 B2
(45) Date of Patent: Mar. 26, 2019

(54) SYSTEMS AND METHODS FOR FALSE ALARM REDUCTION DURING EVENT DETECTION

(71) Applicant: International Business Machines Corporation, Armonk, NY (US)

(72) Inventors: Quanfu Fan, Lexington, MA (US); Sachiko Miyazawa, White Plains, NY (US); Sharathchandra U. Pankanti, Darien, CT (US); Hoang Trinh, Bellevue, WA (US)

(73) Assignee: International Business Machines Corporation, Armonk, NY (US)

( * ) Notice: Subject to any disclaimer, the term of this patent is extended or adjusted under 35 U.S.C. 154(b) by 199 days.

(21) Appl. No.: 15/163,223

(22) Filed: May 24, 2016

(65) Prior Publication Data

US 2016/0267329 A1    Sep. 15, 2016

Related U.S. Application Data

(62) Division of application No. 13/428,982, filed on Mar. 23, 2012, now Pat. No. 9,396,621.

(51) Int. Cl.
*G06K 15/00* (2006.01)
*H04N 7/18* (2006.01)
(Continued)

(52) U.S. Cl.
CPC ..... *G06K 9/00771* (2013.01); *G06K 7/10009* (2013.01); *G06K 9/00335* (2013.01);
(Continued)

(58) Field of Classification Search
CPC .................. G06K 9/00771; G06Q 20/4016
See application file for complete search history.

(56) References Cited

U.S. PATENT DOCUMENTS

| 6,236,736 B1 | 5/2001 | Crabtree et al. |
| 8,010,402 B1 | 8/2011 | Sharma et al. |
| (Continued) | | |

OTHER PUBLICATIONS

Antonakaki, Panagiota, Dimitrios Kosmopoulos, and Stavros J. Perantonis. "Detecting abnormal human behaviour using multiple cameras." Signal Processing 89.9 (2009): 1723-1738.*

(Continued)

*Primary Examiner* — Rebecca A Volentine
(74) *Attorney, Agent, or Firm* — Bryan D. Wells; Nicholas L. Cadmus

(57) ABSTRACT

Embodiments of the present invention provide a system, method, and program product to determine whether a product has been successfully purchased by identifying in a video record when a movement of a product adjacent to a scanner occurs, and whether the scanner did not record a purchase transaction at that time; measuring a difference in time between the time of the movement of the product and a time of another movement of a product, and determining by a trained support vector machine a likelihood that the product was successfully purchased. Alternately, the difference in time can be measured between the time of the movement of the product and a time of a transaction record, or between the time of the movement of the product and a boundary time. The support vector machine can use a radial basis function kernel and can generate a decision value and a confidence score.

18 Claims, 4 Drawing Sheets

(51) Int. Cl.
G06K 9/00 (2006.01)
G07G 1/00 (2006.01)
G06K 9/62 (2006.01)
G06K 7/10 (2006.01)

(52) U.S. Cl.
CPC ......... *G06K 9/6256* (2013.01); *G06K 9/6269* (2013.01); *G07G 1/009* (2013.01); *G07G 1/0036* (2013.01); *G07G 1/0045* (2013.01); *H04N 7/18* (2013.01); *H04N 7/183* (2013.01)

(56) References Cited

U.S. PATENT DOCUMENTS

| | | | |
|---|---|---|---|
| 8,104,680 | B2 | 1/2012 | Kundu et al. |
| 8,462,212 | B1* | 6/2013 | Kundu .................. G07G 1/0081 348/150 |
| 8,538,820 | B1 | 9/2013 | Migdal et al. |
| 2006/0104479 | A1 | 5/2006 | Bonch-Osmolovskiy et al. |
| 2006/0243798 | A1* | 11/2006 | Kundu .................... G06Q 20/00 235/383 |
| 2007/0057049 | A9 | 3/2007 | Kundu et al. |
| 2007/0058040 | A1 | 3/2007 | Zhang et al. |
| 2007/0272734 | A1* | 11/2007 | Lipton .................... G06Q 20/20 235/375 |
| 2008/0303902 | A1 | 12/2008 | Romer et al. |
| 2009/0016600 | A1 | 1/2009 | Eaton et al. |
| 2009/0226099 | A1 | 9/2009 | Kundu et al. |
| 2010/0030685 | A1 | 2/2010 | Bobbitt et al. |
| 2010/0059589 | A1 | 3/2010 | Goncalves et al. |
| 2010/0100693 | A1 | 4/2010 | Kerley et al. |
| 2010/0134624 | A1* | 6/2010 | Bobbitt .................... G07F 19/20 348/150 |
| 2010/0135528 | A1 | 6/2010 | Bobbitt et al. |
| 2010/0169169 | A1 | 7/2010 | Connell, II et al. |
| 2012/0027297 | A1* | 2/2012 | Feris ........................ G06K 9/34 382/173 |
| 2012/0075450 | A1 | 3/2012 | Ding et al. |
| 2012/0093370 | A1 | 4/2012 | Ding et al. |
| 2012/0169879 | A1* | 7/2012 | Libal .................... G06Q 10/063 348/150 |

OTHER PUBLICATIONS

Antonakaki et al., "Detecting abnormal human behaviour using multiple cameras," Signal Processing, vol. 89 Issue 9, Sep. 2009, pp. 1723-1738.

Chang et al. "LIBSVM: A Library for Support Vector Machines," ACM Transactions on Intelligent Systems and Technology, vol. 2, Issue 3, Apr. 2011, ACM Digital Library.

Chen et al., "Active Learning in Multiple Modalities for Semantic Feature Extraction from Video," Jul. 1, 2005, Published in the 20th National Conference on Artificial Intelligence (AAAI 2005) Workshop on Learning in Computer Vision, Pittsburgh Jul. 9-13, 2005.

Fan et al., "Detecting Sweethearting in Retail Surveillance Videos," IEEE International Conference on Acoustics, Speech and Signal Processing, 2009. ICASSP 2009, pp. 1449-1452, Apr. 19-24, 2009, IEEE. doi: 10.1109/ICASSP.2009.4959867.

Fan et al., "Fast Detection of Retail Fraud Using Polar Touch Buttons," IEEE International Conference on Multimedia and Expo, 2009. ICME 2009, pp. 1266-1269, Jun. 28-Jul. 3, 2009, IEEE. doi: 10.1109/ICME.2009.5202732.

Fan et al., "Recognition of Repetitive Sequential Human Activity," IEEE Conference on Computer Vision and Pattern Recognition, 2009. CVPR 2009, pp. 943-950, Jun. 20-25, 2009, IEEE. doi: 10.1109/CVPR.2009.5206644.

Fan et al., "Systems and Methods for False Alarm Reduction During Event Detection," U.S. Appl. No. 13/428,982, filed Mar. 23, 2012, 28 pages.

Hoi et al., "A Multimodal and Multilevel Ranking Scheme for Large-Scale Video Retrieval," IEEE Transactions on Multimedia, vol. 10, No. 4, pp. 607-619, Jun. 2008, IEEE. doi: 10.1109/TMM.2008.921735.

Hsu et al., "A Practical Guide to Support Vector Classification," initial version 2003, last updated Apr. 15, 2010, pp. 1-16, <http://www.csie.ntu.edu.tw/~cjlin/papers/guide/guide.pdf>.

Joachims, Thorsten, "Optimizing Search Engines using Clickthrough Data," KDD '02: Proceedings of the Eighth ACM SIGKDD International Conference on Knowledge Discovery and Data Mining, Jul. 2002, ACM, Inc., New York, NY. doi>10.1145/775047.775067.

Kapoor et al., "Probabilistic Combination of Multiple Modalities to Detect Interest," Proceedings of the 17th International Conference on Pattern Recognition, 2004. ICPR 2004. vol. 3, pp. 969-972, Aug. 23-26, 2004. doi: 10.1109/ICPR.2004.1334690.

Poulisse et al., "News Story Segmentation in Multiple Modalities," Journal Multimedia Tools and Applications, Vos. 48, Issue 1, pp. 1-14, May 2010, Kluwer Academic Publishers, Hingham, MA. doi>10.1007/s11042-009-0358-9.

Richter et al., "Multimodal Ranking for Image Search on Community Databases," Mar. 2010 MIR '10: Proceedings of the International Conference on Multimedia Information Retrieval. ACM, Inc., New York, NY. doi>10.1145/1743384.1743402.

Trihn et al., "Detecting Human Activities in Retail Surveillance using Hierarchical Finite State Machine," IEEE International Conference on Acoustics, Speech and Signal Processing (ICASSP), 2011, pp. 1337-1340, May 22-27, 2011. doi: 10.1109/ICASSP.2011.5946659.

"IntelliVid Video Intelligence Solutions," American Dynamics, A Tyco International Company, © Tyco International Ltd., printed Mar. 23, 2012, <http://www.americandynamics.net/Products/IntelliVid_Video_Intelligence.aspx>.

"Retail Loss Prevention—POS Video Auditing," © 2011 Agilence, Inc., printed Mar. 23, 2012, <http//www.agilenceinc.com/>.

"StopLift Checkout Vision Systems," printed Oct. 27, 2011, <www.stoplift.com>.

"Support Vector Machine," Wikipedia, the free encyclopedia, web page last modified Mar. 22, 2012, <http://en.wikipedia.org/wiki/Support_vector_machine>.

Appendix P—List of IBM Patents or Patent Applications Treated as Related, 2 Pages.

* cited by examiner

SYSTEMS AND METHODS FOR FALSE ALARM REDUCTION DURING EVENT DETECTION

FIELD OF THE INVENTION

The present invention relates generally to product scanning during checkout at a retail point of sale, and more specifically to automated systems for determining if a cashier has faked a barcode scan to avoid charging a customer for the product and for monitoring other types of events.

BACKGROUND

The use of video surveillance and video analysis to deter or detect theft by customers and employees in retail settings is commonplace. These practices typically create too much video data for humans to effectively manage or review. As such, computerized tools for filtering and mining the video data to determine patterned behavior, anomalistic behavior, or other markers of theft are being increasingly used. These computerized tools typically have difficulty identifying ordinary theft behavior. Further, these computerized tools have particular difficulty identifying sophisticated theft behavior, such as when cashiers "sweetheart" transactions for their own benefit or for a customer's benefit. Sweethearting occurs, for example, when a cashier intentionally bypasses a barcode scanner during the product checkout process. Similar issues arise when cashiers unintentionally bypass the barcode scanner.

Current solutions that attempt to address these problems are typically based on analyzing the data available from retail store systems, such as the point of sale system, to identify behavior that potentially indicates theft. For example, one current solution includes using this identified behavior to trigger manual review of video records from a video surveillance system to provide visual verification of the theft. Another current solution has approached the problem by using computer algorithms to directly analyze the video from the video surveillance system, in order to detect a level of abnormal behavior visually, independent of other data. Both of these solutions have drawbacks. In the former case, it might take a long time for identified patterns to trigger manual review, while in the latter case a high false alarm rate is typically exhibited.

General current solutions in the video analysis field involve performing more sophisticated video analysis in order to extract features from video data. For example, in Chen, Ming-yu and Hauptmann, Alexander, "Active Learning in Multiple Modalities for Semantic Feature Extraction from Video" (2005). *Computer Science Department.* Paper 976, the authors attempt to improve the way a support vector machine extracts features in video data by performing a linear combination of sub-modeled feature sets. Such general current solutions in the video analysis field do not directly address retail theft detection or the false alarm issue.

Specific current solutions involve integrating video analytics and data analysis in attempts to exploit their combined strengths, in order to compensate for the limitations of previous solutions. For example, in U.S. Patent Pub. No. 2008/0303902 A1, video content of an activity occurring at a monitored facility and transaction data relating to a transaction processed at a transaction terminal are collected and correlated. Subsequently, user-defined rules are applied to the correlated data, and by matching the data with the rules, potentially suspicious transactions are identified. For example, a potentially suspicious transaction is identified when a return transaction has occurred but when no customers are near the point of sale. Current solutions that integrate information in this manner typically suffer from higher than acceptable false alarms rates.

SUMMARY

Embodiments of the present invention provide a system, method, and program product to determine whether a product has been successfully purchased at a check-out register including a product purchase scanner. A computer identifies in a video record a movement of a product adjacent to a scanner and an approximate time at which the product was moved adjacent to the scanner. The computer determines that the scanner did not record a purchase transaction within a predetermined time of the time at which the product was moved adjacent to the scanner as identified in the video record. The computer measures a difference in time between the time of the movement of the product adjacent to the scanner and a time of another movement of a product adjacent to the scanner, and determines with a trained support vector machine a likelihood that the product was successfully purchased.

DETAILED DESCRIPTION

Figure 1:
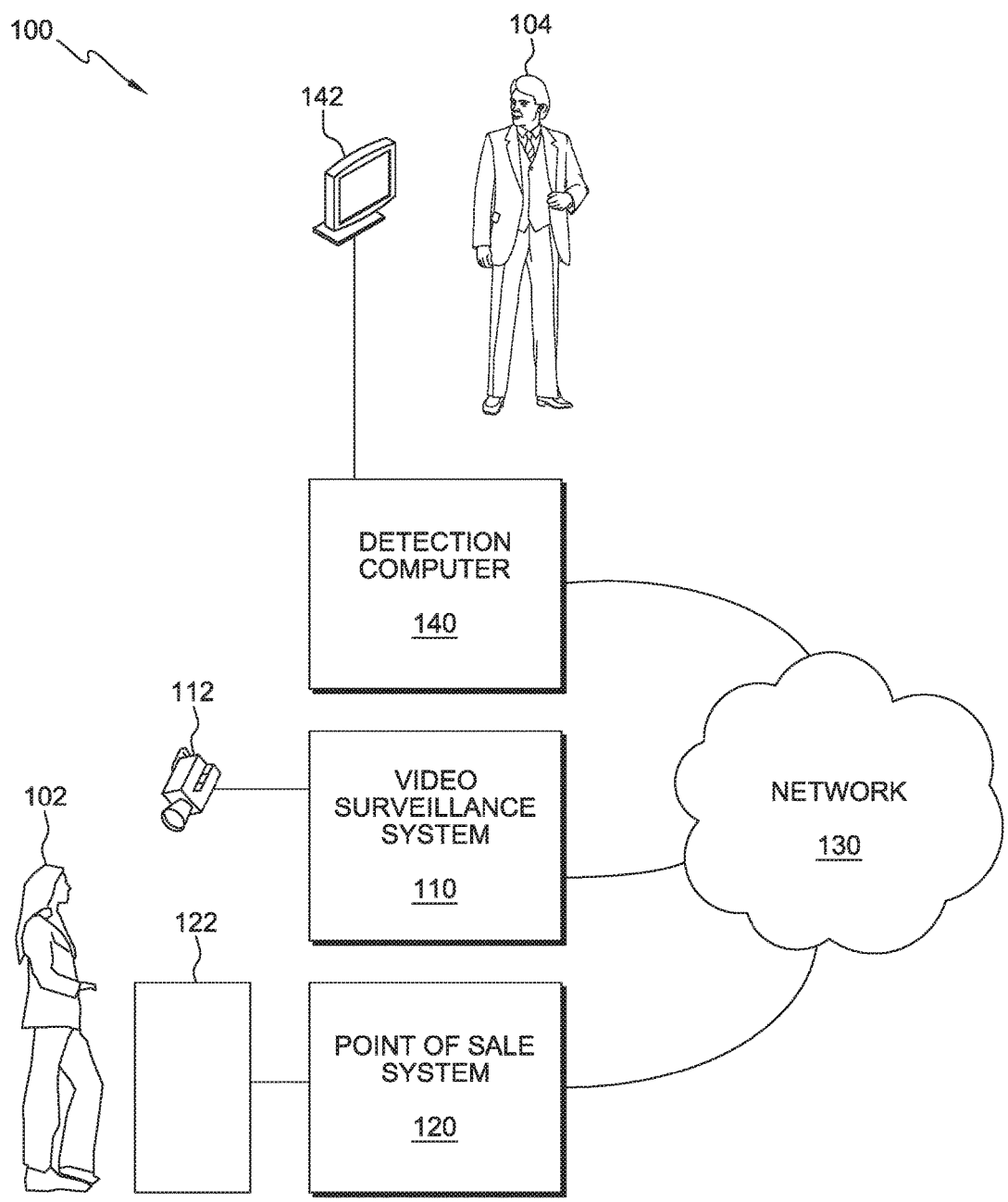
FIG. 1 is a functional block diagram of a fakescan detection system in accordance with an embodiment of the present invention.

A preferred embodiment of the invention is practiced in the context of a detection computer 140 analyzing data received from several other systems operating in a retail sales environment, as depicted in FIG. 1. The other systems include, for example, video surveillance system 110 and point of sale system 120 that logs transaction data from point of sale terminal 122. Video surveillance system 110 makes a video log that includes recordings of a cashier, person 102, interacting with point of sale terminal 122 while performing a purchase transaction, for example by swiping a product for purchase past a barcode scanner of point of sale terminal 122. A transaction log, stored for example in detection computer 140, includes an individual transaction record that includes a timestamp and that is representative of a successful barcode scan. Detection computer 140 analyzes the video log to identify particular transaction-related physical activities of the cashier, such as swiping a product across the scanning zone of the barcode scanner. Detection computer 140 matches up the identified physical activities with individual transaction records in the transaction log. Any identified swiping physical activity that cannot be successfully matched with a transaction record is provisionally identified as a detected "fakescan" by detection computer 140. Such a fakescan could be caused by the cashier deliberately concealing a barcode on the product from view of the barcode scanner. Alternatively, the fakescan could be an innocent mistake, or even a false alarm introduced by "noise" or misidentified activity in the video log.

To distinguish between identified physical activities that are actually fakescans and those that have been misidentified as such, detection computer 140 processes the detected fakescans utilizing a set of heuristic rules in conjunction with a support vector machine classifier, which is a type of computer-based classifier. In particular, detection computer 140 generates a set of scores for each detected fakescan that are related to the likelihood that the identified fakescan is an actual fakescan, and inputs the set of scores into the support vector machine classifier. The support vector machine classifier then makes a determination of whether or not the detected fakescan is actually a fakescan, based on the set of scores, and also provides a confidence score for the determination.

FIG. 1 is a functional block diagram illustrating fakescan detection system 100 in accordance with an embodiment of the present invention. Fakescan detection system 100 includes video surveillance system 110 and associated camera 112, point of sale system 120 and associated point of sale terminal 122, and detection computer 140 and associated monitor 142, all interconnected over network 130. Network 130 can be, for example, a local area network (LAN), a wide area network (WAN) such as the Internet, or a combination of the two, and can include wireline or wireless connections. In general, network 130 can be any combination of connections and protocols that will support communications between video surveillance system 110, point of sale system 120, and detection computer 140 in accordance with an embodiment of the invention.

Video surveillance system 110 is a video surveillance system for deterring and detecting theft, by monitoring and recording the goings-on in the retail environment of FIG. 1. In particular, video surveillance system 110 is connected to one or more cameras, such as camera 112, which are oriented to have a suitable view of a retail point of sale location and the person or persons acting within it, such as point of sale terminal 122 and person 102. In various embodiments, video surveillance system 110 may be configured to record different types of information, such as audio information, low-light video information, infrared video information, or active sensor radar information, for example. In yet other embodiments, other types of sensors and surveillance systems can be used, and the techniques introduced herein are not limited to any particular form of sensor or surveillance system. Video surveillance system 110 typically includes computers, electronics, and networks necessary for controlling various cameras and gathering and storing video data from the various cameras. Video surveillance system 110 may rely on network 130 in whole or in part for communication with the various cameras.

Point of sale system 120 is a point of sale system for sensing and recording the purchases performed during a purchase transaction at one or more point of sale terminals in the retail environment of FIG. 1, such as point of sale terminal 122. In one embodiment, a purchase transaction involves person 102, who interacts with the purchased product and with point of sale terminal 122. Person 102 can be a cashier, in one embodiment, or a customer in a self-checkout lane, in another embodiment. Point of sale system 120 can be configured to operate with numerous point of sale terminals in addition to point of sale terminal 122, such as would be the case in a large grocery store with multiple checkout lanes, for example. In one embodiment, camera 112 has a view only of point of sale terminal 122 and person 102. In another embodiment, camera 112 has a wider view encompassing additional point of sale terminals and people, or of every point of sale terminal and person in a retail setting. Point of sale system 120 typically includes computers, electronics, and networks necessary for controlling various point of sale terminals and gathering transaction data from them. Point of sale system 120 may rely on network 130 in whole or in part for communication with the various point of sale terminals.

Point of sale terminal 122 can include a barcode scanner for scanning a barcode printed on a product. Further, point of sale terminal 122 can include a radio-frequency identification ("RFID") scanner for receiving RFID signals from an RFID chip included in a product. Besides various scanners, point of sale terminal 122 can also include a cash register, a payment system such as a credit card reader, an electronic scale, and a keypad for the manual entry of a product code by person 102. In other embodiments, other types of scanners and systems can be associated with point of sale system 120, and the techniques introduced herein are not limited to any particular type described herein.

Detection computer 140, which is discussed in greater detail with reference to FIG. 2 below, is connected to one or more monitors, such as monitor 142. Person 104 is a manager, owner, or security staff member in the retail environment of FIG. 1, and uses monitor 142 and detection computer 140 to become aware of and respond to detected theft, according to the techniques introduced herein.

Figure 2:
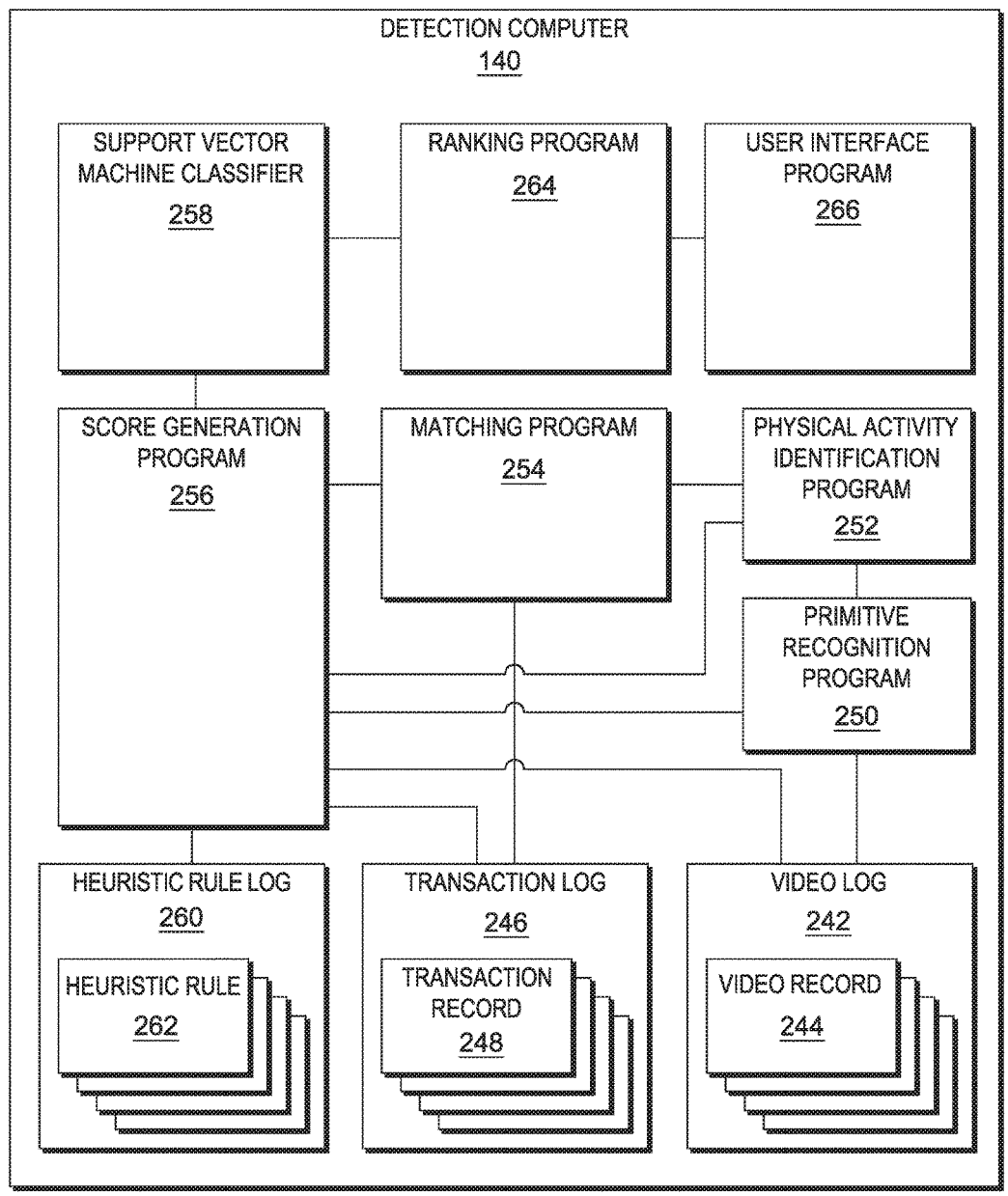
FIG. 2 is a functional block diagram of the fakescan detection computer of FIG. 1 including fakescan detection software in accordance with an embodiment of the present invention.

FIG. 2 is a functional block diagram illustrating detection computer 140 in detail, in accordance with an embodiment of the present invention. As shown in FIG. 2, detection computer 140 includes video log 242, transaction log 246, heuristic rule log 260, primitive recognition program 250, physical activity identification program 252, matching program 254, score generation program 256, support vector machine classifier 258, ranking program 264, and user interface program 266. In various embodiments, detection computer 140 and associated monitor 142 can include a laptop, tablet, or netbook personal computer (PC), a desktop computer, a personal digital assistant (PDA), a smart phone, a mainframe computer, or a networked server computer. In general, detection computer 140 can be any programmable electronic device as described in further detail with respect to FIG. 4.

Video log 242 stores video records 244 received from video surveillance system 110 and associated camera 112. In one embodiment, a single video record 244 includes a video camera output (e.g., the output of video camera 112) recorded over a period of time, and an additional video record 244 includes video camera output of the same video camera recorded over a previous or subsequent period of time. In another embodiment, the additional video record 244 might instead include video camera output recorded by a different video camera recorded at the same time. Typically, each video record 244 includes timing information, such as a start time of the video record 244 an end time of the video record 244, and intermediate index times within the video record 244 (such as one second interval index times, for example), which can be utilized when comparing records in transaction log 246 and video log 242, as discussed below. In another embodiment video records 244, or video log 242, may be stored in video surveillance system 110, rather than in detection computer 140.

Transaction log 246 stores transaction records 248 from point of sale system 120 and associated point of sale terminal 122. In one embodiment, a single transaction record 248 includes data regarding a specific purchase made during a purchase transaction, such as data representing a barcode scan event, data representing an RFID scan event, or data representing a combined keypad and electronic scale measuring event (for example, the event in which person 102 weighs a piece of fruit and manually keys in the fruit's product code). Typically, each transaction record 248 includes a timestamp, which is utilized when comparing records in transaction log 246 and video log 242, as discussed below. In another embodiment transaction records 248, or transaction log 246, may be stored in point of sale system 120, rather than in detection computer 140.

Together, transaction log 246 and video log 242 typically store all of the data gathered from the retail environment, including data related to person 102, camera 112, and point of sale terminal 122 with which detection computer 140 performs further analysis, as discussed below.

Primitive recognition program 250 and physical activity identification program 252 typically operate together to analyze video log 242 to identify specific physical activities of one or both of the customer and the cashier, such as movement of a product past the barcode scanner and movement of a product into a shopping bag. Physical activity identification program 252 makes records of and provides the identified physical activities to matching program 254 for further processing, as discussed below.

In particular, primitive recognition program 250 examines video record 244 of video log 242 to recognize behavioral primitives exhibited in video record 244. Behavioral primitives include, for example, the action of person 102 picking up a product with his or her hand when the product approaches person 102 on the check-out lane's conveyor belt. Other behavioral primitives include the action of person 102 swiping the picked-up product across the scanning zone of a barcode reader of point of sale terminal 122, and the action of person 102 dropping off the product in the bagging area of the check-out lane. Behavioral primitives are not limited to actions involved with product scanning. For example, further behavioral primitives include the action of a customer handing a credit card to person 102, the action of a bagging clerk placing a purchased product into a bag, the action of a shopping cart rolling into the checkout lane, etc. In various embodiments, many types of behavioral primitives, not limited to those described above, can be exhibited in video record 244 and recognized by primitive recognition program 250. Behavioral primitives can be recognized, in one embodiment, by use of the techniques discussed in Q. Fan, A. Yanagawa, R. Bobbitt, Y. Zhai, R. Kjeldsen, S. Pankanti, and A. Hampapur, "Detecting sweethearting in retail surveillance videos," ICASSP09, 2009, which is herein incorporated by reference in its entirety.

Behavioral primitives recognized by primitive recognition program 250, as discussed above, are provided by primitive recognition program 250 to physical activity identification program 252 as a digital record. Physical activity identification program 252 examines the recognized behavioral primitives and attempts to combine them into identified physical activities by determining if two or more behavioral primitives can be associated together as representative of a particular established type of physical activity. For example, physical activity identification program 252 can combine the three actions of person 102 picking up a product, swiping the picked-up product across the scanning zone, and dropping off the product in the bagging area into a physical activity called a "visual scan," by correlating the three actions across their respective locales. As will be discussed in greater detail below, such identified visual scans will be further subcategorized into true visual scans and fake visual scans, or "fakescans." Behavioral primitives can be combined into identified physical activities, in one embodiment, by use of the techniques discussed in Q. Fan, R. Bobbit, Y. Zhai, A. Yanagawa, S. Pankanti, and A. Hampapur, "Recognition of Repetitive Sequential Human Activity," *CVPR*, 2009, which is herein incorporated by reference in its entirety.

From time to time, physical activity identification program 252 will not successfully combine every behavioral primitive recognized and provided by primitive recognition program 250 into an identified physical activity. In one case, this can occur when primitive recognition program 250 misrecognizes a behavioral primitive. For example, primitive recognition program 250 might misrecognize the action of a customer handing a credit card to person 102 as, instead, the action of person 102 swiping the picked-up product across the scanning zone of a barcode reader. As a result, the misrecognized behavioral primitive might not be combinable with previous or subsequent additional behavioral primitives into an identified physical activity. Therefore at least one, and possibly several, behavioral primitives may not be combined when primitive recognition program 250 misrecognizes a behavioral primitive.

In another case, a failure to combine every behavioral primitive can also occur when the behavior of person 102 falls outside of the established types of physical activities. For example, person 102 might reach into a pick-up area twice, out of hesitation or uncertainty, before actually picking up a product. Such hesitation or uncertainty is a form of behavior that does not neatly fall within the established type of physical activity "visual scan," and yields an "extra" behavioral primitive that is not readily combinable by physical activity identification program 252. Continuing with the example, in this case primitive recognition program 250 provides four behavioral primitives (two pick-up actions, one swipe action, and one drop-off action) to physical activity identification program 252, rather than the three discussed above. Physical activity identification program 252 then attempts to select three of the four recognized behavioral primitives for combination into an identified visual scan physical activity, while disregarding the fourth (e.g., while treating one of the two pick-up actions as a spurious recognized behavioral primitive, or as "noise"). Therefore, the fourth behavioral primitive will not be combined into an identified physical activity.

As stated in discussion of two cases above, physical activity identification program 252 will not always successfully combine every recognized behavioral primitive into an identified physical activity. In addition, it is further the case that physical activity identification program 252 will sometimes combine particular behavioral primitives into a misidentified physical activity. For example, in the preceding case in which a misrecognized behavioral primitive is not readily combinable with previous or subsequent additional behavioral primitives, it is possible that physical activity identification program 252 will then combine those additional behavioral primitives into a misidentified physical activity that does not comport with the activity actually performed by person 102. For another example, in the preceding case in which physical activity identification program 252 combined three recognized behavioral primitives into a physical activity and disregarded a fourth, it is possible that physical activity identification program 252 rejected the "wrong" one of the two pick-up actions. For instance, the "wrong" one of the two pick-up actions might be the first pick-up action, after which person 102 hesitated, and then performed the second pick-up action. By selecting the first pick-up action, physical activity identification program 252 has thus changed the apparent start time and duration of the resulting identified visual scan physical activity, which thus does not comport with the activity actually performed by person 102. Such misidentifications have consequences which are explained further below.

As described above, primitive recognition program 250 and physical activity identification program 252 thus provide identified physical activities (and, occasionally, misidentified physical activities) to matching program 254. Some of the provided physical activities, whether identified properly or misidentified, are visual scan physical activities. The discussion below relates to subcategorizing these visual scans into true visual scans and fakescans. It should be understood, however, that physical activities besides visual scans can also be provided by primitive recognition program 250 and physical activity identification program 252 for further consideration by detection computer 140.

Matching program 254 receives physical activities provided by physical activity identification program 252, and also receives transaction records, such as transaction record 248, from transaction log 246. In one embodiment, matching program 254 matches visual scan physical activities with transaction records that include barcode scan information, using a matching algorithm described below. After performance of the matching algorithm, the visual scans that are successfully matched are regarded as true visual scans, and any unmatched visual scans are regarded as fakescans. Such detected fakescans are visual scan physical activities that have no matched transaction record.

In one embodiment, the matching algorithm of matching program 254 is a bipartite matching algorithm. In one embodiment, the matching algorithm selected will optimally match visual scans with transaction records, such that a minimal number of fakescans are detected. Typically, to determine that a visual scan is not matched with a transaction record, matching program 254 either determines that the visual scan, as identified by physical activity identification program 252, does not correspond in time with a transaction record, or determines that no transaction record was generated during the pendency of the visual scan, for example. In particular, in one embodiment, matching program 254 considers each visual scan to have been performed within a particular period of time, which extends in duration from the beginning of a recognized pick-up behavioral primitive, through the swiping behavioral primitive, to the end of the drop-off behavioral primitive. If no transaction record in the transaction log has a timestamp that corresponds with the period of time, then a match is not made. In one embodiment, such timestamp correspondence occurs when the timestamp falls anywhere within the physical activity's period of time. In another embodiment, such timestamp correspondence occurs when the timestamp falls within the shorter duration of the swiping behavioral primitive. In some cases, the transaction log will not contain any transaction records generated during the period of time, and as such no match is determined. In any case, if no match is determined between a given visual scan physical activity and a transaction record, then the visual scan is regarded as a detected fakescan. Matching program 254 can utilize, in one embodiment, the techniques discussed in H. Trinh, Q. Fan, S. Pankanti, P. Gabbur, J. Pan, and S. Miyazawa, "Detecting human activities in retail surveillance using hierarchical finite state machine," *ICASSP*, 2011, which is herein incorporated by reference in its entirety.

After detecting a fakescan as described above, matching program 254 provides the detected fakescan (e.g., the unmatched visual scan) to score generation program 256 for processing, as discussed further below. Before proceeding further in this discussion, it should be noted that the detected fakescans can have a variety of origins. For example, such fakescans could be caused by person 102 (as either the customer during self check-out, or as the cashier, for example) deliberately concealing or covering a barcode on a product from view of a barcode scanner of point of sale terminal 122. Person 102 might do this to steal the product. Alternatively, the concealment, and thus the resulting detected fakescan, could be an innocent mistake made by person 102. Further still, the detected fakescan might have been introduced by the misrecognition of behavioral primitives or misidentification of physical activities discussed above. As such, the detected fakescan might not comport with any action of person 102, and instead is an artifact introduced during the processing of video log 242 and transaction log 256 by detection computer 140. In the case of the deliberate or innocuous barcode concealment, timely intervention by retail environment personnel is necessary to prevent the product from leaving the retail environment. These are true alarms that should be dealt with to prevent loss. However, in the case of a detected fakescan introduced by misrecognition or misidentification within detection computer 140, no intervention is actually required, because loss is probably not actually going to happen. In other words, such detected fakescans are false alarms, which will needlessly consume attention and resources within the retail environment if physically investigated.

Typically, the ratio of detected fakescans to all physical activities will be small, because deliberate or innocuous barcode concealment is rare, and because misrecognition or misidentification within detection computer 140 is also rare. The ratio of detected fakescans to all visual scans is also typically small, for the same reason. Nevertheless, because the volume of business in a typical retail environment is so high, even a small ratio of detected fakescans can result in unacceptably high rates of false alarms. For example, in a retail environment that produces hundreds of thousands of transactions per day, such as a busy discount retailer warehouse store, a one percent ratio of detected fakescans to all visual scans still yields thousands of detected fakescans per day. Unless the detected fakescans are processed further to determine which of the detected fakescans actually comport with activities performed by person 102, then either all of the detected fakescans must be physically investigated by retail environment personnel, or some of the detected fakescans must be ignored.

Score generation program 256 receives the detected fakescans from matching program 254, and determines which of them actually comport with false visual scans by generating sets of scores for the detected fakescans according to heuristic rules 262, received from heuristic rule log 260. Score generation program 256 may also receive true visual scans or other identified physical activities from matching program 254. Further, score generation program 256 receives behavioral primitives from primitive recognition program 250, receives identified physical activities from physical activity identification program 252, receives transaction records 248 from transaction log 246, and receives video records 244 from video log 242. Typically, each of heuristic rules 262 is selected based on a known or suspected ability to correlate (either positively or negatively) with the probability, or likelihood, that a given detected fakescan actually comports with a false visual scan physical activity.

For example, score generation program 256 uses a first heuristic rule 262 to generate a score for a given detected fakescan, where the score is the temporal distance between the detected fakescan and the nearest-in-time key-in event. A key-in event occurs when person 102 operates a keypad of point of sale terminal 122, and can be represented by a transaction record in transaction log 246. Alternately, a key-in event can also be represented as an identified physical activity outputted by physical activity identification program 252. In either case, score generation program 256 applies the first heuristic rule 262 to measure the temporal distance between a detected fakescan and the nearest-in-time key-in event. Typically, as this score increases, the likelihood that the detected fakescan is actually a false visual scan increases, because if a key-in event is close in time to the detected fakescan, then the key-in event was probably substituted for a barcode visual scanning event.

Score generation program 256 further uses a second heuristic rule 262 to generate a score for a given detected fakescan, where the score is the temporal distance between the detected fakescan and the nearest-in-time barcode signal. A barcode signal occurs when person 102 successfully scans a product on a barcode scanner, and can be represented by a transaction record in transaction log 246. Typically, as this score increases, the likelihood that the detected fakescan is actually a false visual scan increases, because if a barcode signal is close in time to the detected fakescan, then the detected fakescan might actually have been associated with the barcode signal, but was simply not successfully matched with the barcode signal during the operation of matching program 254, for example.

Score generation program 256 further uses a third heuristic rule 262 to generate a score for a given detected fakescan, where the score is the temporal distance between the detected fakescan and a nearest-in-time previous or subsequent detected fakescan. In order to utilize this third heuristic rule, score generation program 256 can receive sets of nearest detected fakescans from matching program 254, or can receive sets of detected fakescans from matching program 254 and make a determination of which are nearest itself. Typically, as this score decreases, the likelihood that the detected fakescan is actually a false visual scan should decrease, because actual false visual scans typically tend not to happen in quick succession.

Score generation program 256 further uses a fourth heuristic rule 262 to generate a score for a given detected fakescan, where the score is the absolute value of the difference in the temporal distances between a previous fakescan and the detected fakescan, and the detected fakescan and a subsequent fakescan. In order to utilize this fourth heuristic rule, score generation program 256 receives three consecutive fakescans from matching program 254. If the difference in the temporal distances is zero, then the first, second, and third detected fakescans are evenly spaced in time. However, if the difference is nonzero, then the middle fakescan is closer in time to either the previous or the subsequent fakescan, and the three fakescans are not evenly spaced in time. Typically, as this score grows (and therefore as the three fakescans become more irregularly spaced in time), the likelihood that the detected fakescan is actually a false visual scan increases, because actual false visual scans typically tend not to happen with regular timing.

Score generation program 256 further uses a fifth heuristic rule 262 to generate a score for a given detected fakescan, where the score is the temporal distance between the detected fakescan and the beginning of the overall transaction it is associated with. Typically, an overall transaction is a set of transaction records 248 representing one complete exchange by a customer in the retail environment. For example, the overall transaction can represent a customer purchasing an entire shopping cart full of groceries from person 102 using point of sale terminal 122. The beginning of the overall transaction is, in one embodiment, the time in the timestamp of the first transaction record 248 of the overall transaction. In other embodiments, the beginning of the overall transaction is set as the time in video log 242 when a customer first approaches person 102, or is set as the time of the first recognized pick-up behavioral primitive performed by person 102 after the customer approaches. In one embodiment, this score is normalized by the duration of the overall transaction. Typically, as this score grows, the likelihood that the detected fakescan is actually a false visual scan decreases. This is the case because actual false visual scans typically tend not to happen at the beginning of the overall transaction, when person 102 is engaged in many activities besides performing visual scans (for example, greeting a customer, opening a wallet or purse, etc.) which are prone to misrecognition or misidentification.

Score generation program 256 further uses a sixth heuristic rule 262 to generate a score for a given detected fakescan, where the score is the temporal distance between the detected fakescan and the end of the overall transaction it is associated with. As such, the sixth heuristic rule shares some similarities with the fifth heuristic rule, above. The end of the overall transaction is, in one embodiment, the time in the timestamp of the last transaction record of the overall transaction. In other embodiments, the end of the overall transaction is set as the time in video log 242 when a customer walks away from person 102 or is set as the time of the last recognized drop-off behavioral primitive performed by person 102 for the customer. In one embodiment, this score is normalized by the duration of the overall transaction. Typically, as this score grows, the likelihood that the detected fakescan is actually a false visual scan decreases. This is the case because actual false visual scans typically tend not to happen at the end of the overall transaction, when person 102 is engaged in many activities besides performing visual scans (for example, saying goodbye a customer, closing a wallet or purse, etc.) which are prone to misrecognition or misidentification.

Score generation program 256 further uses a seventh heuristic rule 262 to generate a score for a given detected fakescan, where the score is the total number of pick-up behavioral primitives within the detected fakescan. In order to utilize this seventh heuristic rule, score generation program 256 can receive a detected fakescan from matching program 254 as well as all recognized behavioral primitives that occurred during the period of time of the detected fakescan from primitive recognition program 250. Typically, as this score increases, the likelihood that the detected fakescan is actually a false visual scan should decrease, because multiple pick-ups indicate a "noisy" recognition or a misrecognition of some behavioral primitive.

Score generation program 256 further uses an eighth heuristic rule 262 to generate a score for a given detected fakescan, where the score is the total number of swipe behavioral primitives within the detected fakescan. This eighth heuristic rule shares similarities with the seventh heuristic rule, above. Typically, as this score increases, the likelihood that the detected fakescan is actually a false visual scan should decrease, because multiple swipes indicate a "noisy" recognition or a misrecognition of some behavioral primitive.

Score generation program 256 further uses a ninth heuristic rule 262 to generate a score for a given detected fakescan, where the score is the total number of drop-off behavioral primitives within the detected fakescan. This ninth heuristic rule shares similarities with the seventh and eighth heuristic rules, above. Typically, as this score increases, the likelihood that the detected fakescan is actually a false visual scan should decrease, because multiple drop-offs indicate a "noisy" recognition or a misrecognition of some behavioral primitive.

Score generation program 256 further uses a tenth heuristic rule 262 to generate a score for a given detected fakescan, where the score is the total number barcode signals in the overall transaction. Typically, an overall transaction is a set of transaction records 248 representing one complete exchange by a customer in the retail environment. For example, the overall transaction can represent a customer purchasing an entire shopping cart full of groceries from person 102 using point of sale terminal 122. The total number barcode signals can be counted by, for example, summing the number of transaction records 248 representative of successful barcode scans that occurred during the overall transaction. Typically, as this score grows, the likelihood that any given detected fakescan in the overall transaction is actually a false visual scan should increase, because with increasing numbers of barcode signals come increasing opportunities for performing an actual false visual scan.

Score generation program 256 further uses an eleventh heuristic rule 262 to generate a score for a given detected fakescan, where the score is the average temporal distance between scans in the overall transaction. This eleventh heuristic rule can be regarded as a generalized averaging of the third heuristic rule. The average temporal distance can be computed between scans represented by transaction records 248 in transaction log 246, or between visual scan physical activities provided by physical activity identification program 252, or by a combination of these, for example. Typically, as this score increases, the likelihood that any given detected fakescan in the overall transaction is actually a false visual scan increases. This is the case because person 102 is utilizing point of sale terminal 102 slower, which may increase the accuracy of physical activity identification program 252 and primitive recognition program 250, and which may also increase the amount of deliberation in the actions of person 102, reducing the rate at which person 102 makes mistakes.

Score generation program 256 further uses a twelfth heuristic rule 262 to generate a score for a given detected fakescan, where the score is the average, for the overall transaction, of the absolute values of the differences in the temporal distances between members of a triplet of scans, where the temporal distances are those between the first and second scan, and the second and third scan. This twelfth heuristic rule can be regarded as a generalized averaging of the fourth heuristic rule. The average difference can be computed with barcode signals represented by transaction records 248 in transaction log 246, or with visual scan physical activities provided by physical activity identification program 252, or by a combination of these, for example. If the average of the differences in the temporal distances is zero, then all scans in the transaction are evenly spaced in time. However, if the average of the differences is nonzero, then at least one scan in the transaction is not evenly spaced in time with regard to the previous and subsequent scans. Typically, as the average of the differences grows (and therefore as the scans become more irregularly spaced in time), the likelihood that any given detected fakescan in the overall transaction is actually a false visual scan should increase, because actual false visual scans typically tend not to happen when all scans in the transaction are evenly spaced in time.

As discussed above, in one embodiment, score generation program 256 uses twelve heuristic rules 262 from heuristic rule log 260 to generate a set of scores for each detected fakescan received from matching program 254. Of course, in various embodiments, score generation program 256 may utilize all twelve heuristic rules 262, fewer heuristic rules, or more heuristic rules. Typically, as stated above, each of heuristic rules 262 is selected based on a known or suspected ability to correlate (either positively or negatively) with the probability, or likelihood, that a given detected fakescan actually comports with a false visual scan physical activity. After generating the set of scores, score generation program 256 provides the resulting scores to support vector machine classifier 258. In one embodiment, score generation program 256 normalizes some or all of the scores prior to providing them to support vector machine classifier 258.

Support vector machine classifier 258 includes a support vector machine in one embodiment, but in other embodiments may include another classifier, such as a binary classifier, a linear classifier, or a nonlinear classifier, for example. Support vector machine classifier 258 receives a set of scores, generated by score generation program 256, which are associated with a particular detected fakescan. Support vector machine classifier 258 performs a computation on the set of scores to generate a decision value and an associated confidence score for the set of scores, and the generated decision value and associated confidence score are then provided to ranking program 264.

Support vector machine classifier 258 uses a support vector machine technique for data classification. Data classification tasks typically involve separating data into training data and testing data. Each datum in the training data includes a target label and a collection of observed data connected to the target label. The goal of using the support vector machine technique is to produce a model, based on the training data, which predicts the target labels of the testing data. Given the training data, a support vector machine technique typically requires solving an optimization problem involving a summation, subject to particular constraints. During training, the support vector machine maps the training data into a higher dimensional space, and finds a separating hyperplane with the maximal margin in the higher dimensional space. Support vector machine techniques typically can utilize different kernels, which are functions that affect the mapping. For example, kernels can include a linear kernel, a polynomial kernel, a radial basis function kernel, and a sigmoid kernel. Radial basis function kernels nonlinearly map data into a higher dimensional space, and therefore can handle cases where the relation between target labels and observed data is not linear. In one embodiment, support vector machine classifier 258 utilizes a radial basis function kernel. Typically a radial basis function kernel has several tunable parameters, C and y. It is typically not known before training which C and y are best for a given problem, and so model selection should be performed to identify good C and y so that the support vector machine can accurately predict unknown data. Of course, achieving a high training accuracy might be counterproductive, by producing a C and y that are overfit to the training data, such that they produce poor results on later testing data.

Accordingly, support vector machine classifier 258 is trained prior to use in fakescan detection system 100 with training data. Training data for use in training of support vector machine classifier 258 can include a training video log. The training video log includes a video record of visual scan physical activities that are known, prior to training, to be either actual fakescans or actual true visual scans. In particular, the training video log is typically annotated with information indicating which of its visual scan physical activities are actual fakescans and actual true visual scans (these annotations are the "target labels" for the testing data, as discussed above). The training video log also typically also depicts other physical activities, which may not be annotated. To train support vector machine classifier 258, the training video log is provided to score generation program 256 and support vector machine classifier 258 in a training mode, along with the annotations describing which visual scans are actual fakescans and which are true visual scans. In the training mode, the annotations of the training video log obviate the need to utilize primitive recognition program 250, physical activity identification program 252, and matching program 254 to detect fakescans.

During training, support vector machine classifier 258 learns from the annotations how to distinguish, generally, between visual scans that are actual fakescans and visual scans that are true visual scans. In particular, during training support vector machine classifier 258 constructs a hyperplane or a set of hyperplanes that achieves a good separation between sets of scores associated with the annotated actual fakescans, and sets of scores associated with the annotated true visual scans. After training, support vector machine classifier 258 has been trained to generate decision values and associated confidence scores during use in fakescan detection system 100, where a decision value includes a binary determination of which side of the constructed hyperplane a particular set of scores lies, and where a confidence score relates to the distance between the constructed hyperplane and the particular set of scores.

As stated above, support vector machine classifier 258 receives a set of scores, which are associated with a particular detected fakescan, and processes the scores to generate a decision value and an associated confidence score for the set of scores. The decision value is a binary determination of whether or not the detected fakescan is actually a false visual scan, and the confidence score indicates how certain support vector machine classifier 258 is about the decision value. In one embodiment, support vector machine classifier 258 is implemented with an open library for support vector machines, such as LIBSVM. In particular, in one embodiment, support vector machine classifier 258 can be implemented by use of the techniques discussed in Chih-Chung Chang and Chih-Jen Lin, "LIBSVM: a library for support vector machines," *ACM Transactions on Intelligent Systems and Technology*, 2:27:1-27:27, 2011, which is herein incorporated by reference in its entirety. Support vector machine classifier 258 provides the generated decision value and associated confidence score to ranking program 264.

Ranking program 264 receives decision values and confidence scores associated with detected fakescans from support vector machine classifier 258, and ranks the detected fakescans. In particular, ranking program 264 typically disregards a particular detected fakescan if support vector machine classifier 258 determined a decision value for the detected fakescan indicating that it is actually not a fakescan. In other words, ranking program 264 ignores detected fakescans that support vector machine classifier 258 determines to be false alarms. After disregarding such detected fakescans, ranking program 264 sorts the remaining detected fakescans according to their associated confidence scores, to produce a set of ranked fakescans. Thus, detected fakescans having a high confidence score will be placed toward the top of the ranked fakescans, while detected fakescans having a low confidence score will be placed toward the bottom of the ranked fakescans. In this manner, ranking program 264 thus prioritizes the detected fakescans, according to whether or not support vector machine classifier 258 has determined each to be a real fakescan, and according to the confidence of support vector machine classifier 258 in that determination.

Ranking program 264 can utilize a threshold value to reduce the number of ranked fakescans remaining in consideration after sorting. After sorting, and after the determinations made by support vector machine classifier 258, the number of ranked fakescans remaining in consideration by detection computer 140 will typically be lower than the number of detected fakescans provided by matching program 254. This is the case because support vector machine classifier 258 typically determines some of the detected fakescans provided by matching program 254 to be false alarms, which are then ignored by ranking program 264. However, in some cases, the number of ranked fakescans remaining in consideration can still be inconveniently large. Therefore, ranking program 264 can utilize the threshold value to further reduce the number of ranked fakescans. For example, the threshold value could be a fixed number, such that ranking program 264 always presents a fixed number of the highest-ranked fakescans for further processing. Or, for example, the threshold value could be a dynamic number, which varies with the amount of personnel, including person 104, who are available in the retail environment to investigate the ranked fakescans at any given time. Further, for example, the threshold value could be a percentage, such that ranking program 264 always presents a particular percentage of the highest-ranked fakescans for further processing.

User interface program 266 receives the ranked fakescans from ranking program 264, and displays the ranked fakescans to person 104 on monitor 142. The display of the ranked fakescans on monitor 142 enables person 104 to invest personnel resources in investigating the highest ranked fakescans, according to the determinations made by support vector machine classifier 258 upon the detected fakescans produced by matching program 254 and related programs of detection computer 140.

Figure 3:
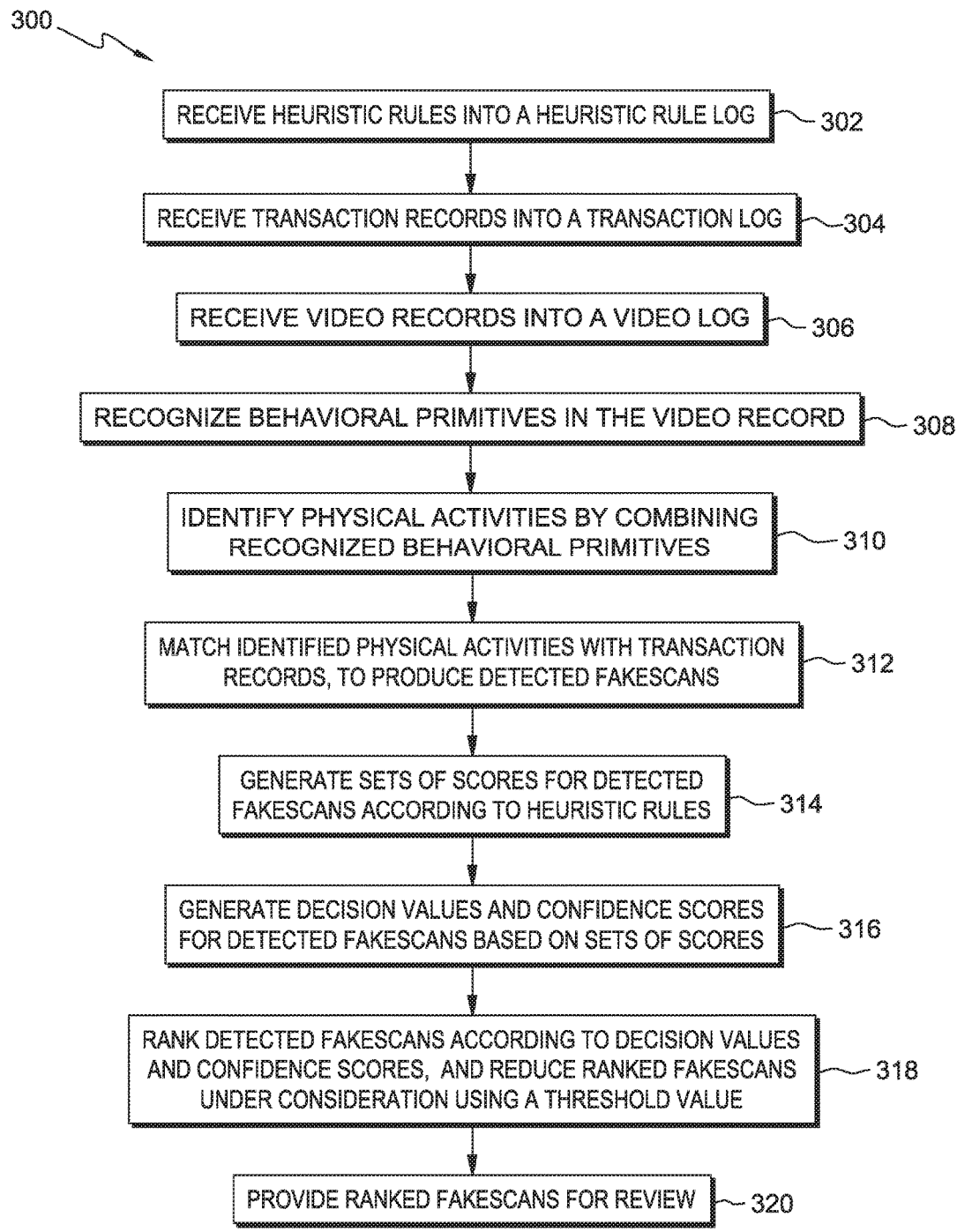
FIG. 3 is a flowchart depicting the steps performed by the fakescan detection software of the fakescan detection computer of FIG. 2 for ranking fakescans in accordance with an embodiment of the present invention.

FIG. 3 depicts flowchart 300, which illustrates steps followed by detection computer 140 in accordance with an embodiment of the present invention. In step 302, detection computer 140 receives heuristic rules 262 into heuristic rule log 260. In step 304, detection computer 140 receives transaction records 248 into transaction log 246. In step 306, detection computer 140 receives video records 244 into video log 242. In one embodiment, step 302 is performed while detection computer 140 is being set-up, while steps 304 and 306 are performed continuously while detection computer 140 is being utilized in a retail environment and person 102 is acting.

In step 308, primitive recognition program 250 recognizes behavioral primitives exhibited in video records 244. In step 310, physical activity identification program 252 identifies physical activities by combining behavioral primitives. In steps 308 and 310, misrecognition of behavioral primitives and misidentification of physical activities can occasionally occur. In step 312, identified physical activities are matched with transaction records 248 by matching program 254. Visual scan physical activities that go unmatched are determined to be false visual scans, or fakescans.

In step 314, score generation program 256 generates sets of scores for detected fakescans utilizing heuristic rules 262. In step 316, support vector machine classifier 258 generates decision values and confidence scores for the detected fakescans based on the sets of scores. In step 318, ranking program 264 ranks the detected fakescans according to the decision values and the confidence scores, and reduces the ranked fakescans under consideration utilizing a threshold value. In step 320, user interface program 266 provides the ranked fakescans for review via monitor 142, so that person 104 can investigate the ranked fakescans.

The foregoing description of various embodiments of the present invention has been presented for purposes of illustration and description. It is not intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

Figure 4:
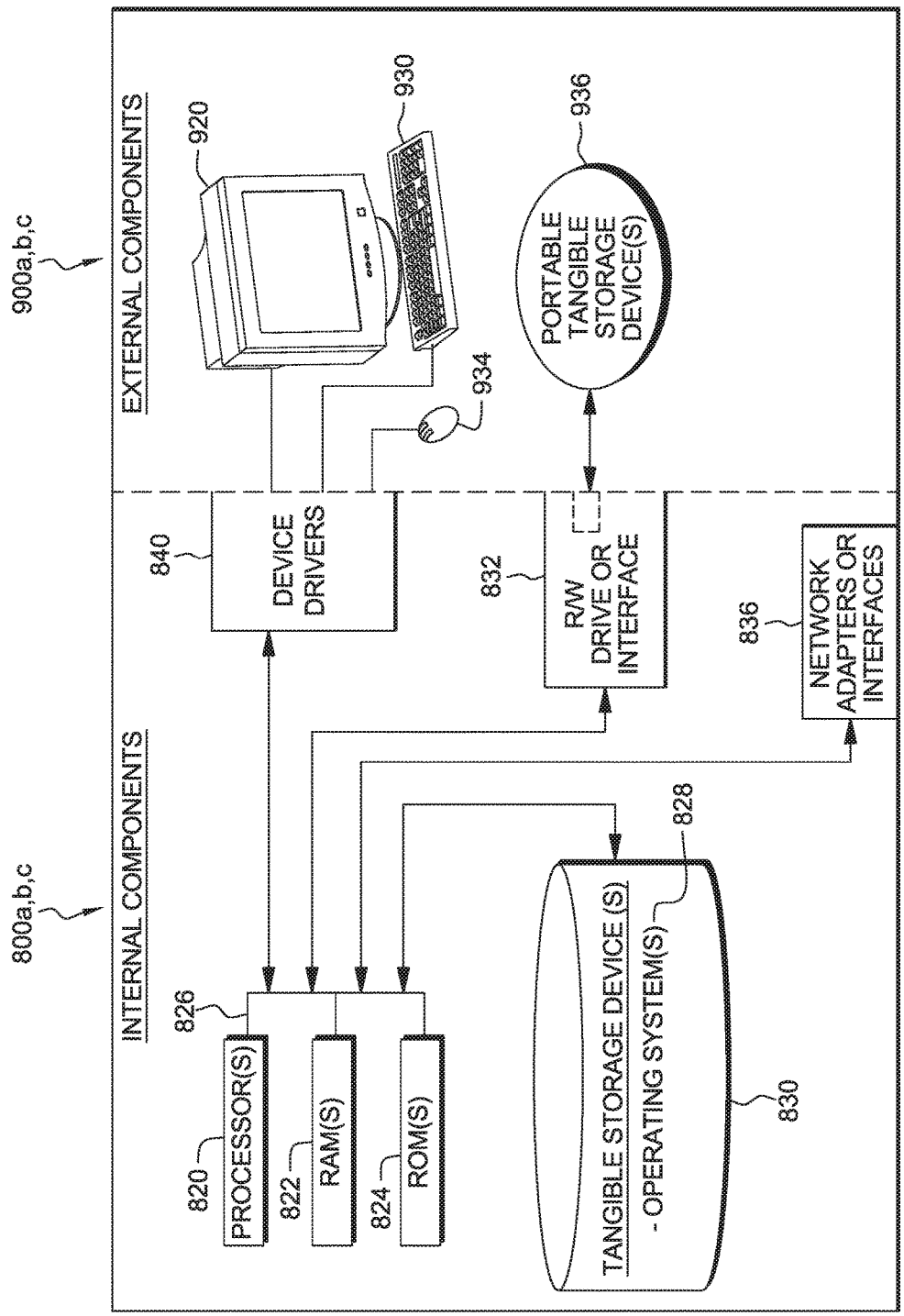
FIG. 4 is a block diagram of hardware and software within the computers of FIG. 1 in accordance with an embodiment of the present invention.

FIG. 4 shows a block diagram of the components of a data processing system 800, 900, such as detection computer 140, a computer of video surveillance system 110, or a computer of point of sale system 120, in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Detection computer 140, a computer of video surveillance system 110, and a computer of point of sale system 120 include respective sets of internal components 800 a, b, c and external components 900 a, b, c illustrated in FIG. 4. Each of the sets of internal components 800 a, b, c includes one or more processors 820, one or more computer-readable RAMs 822 and one or more computer-readable ROMs 824 on one or more buses 826, and one or more operating systems 828 and one or more computer-readable tangible storage devices 830. The one or more operating systems, programs 250, 252, 254, 256, 258, 264, and 266, and logs 260, 246, and 242 in detection computer 140 are stored on one or more of the respective computer-readable tangible storage devices 830 for execution or access by one or more of the respective processors 820 via one or more of the respective RAMs 822 (which typically include cache memory). In the embodiment illustrated in FIG. 4, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a, b, c also includes a R/W drive or interface 832 to read from and write to one or more portable computer-readable tangible storage devices 936 such as a CD-ROM, DVD, memory stick, magnetic tape, magnetic disk, optical disk or semiconductor storage device. The programs 250, 252, 254, 256, 258, 264, and 266, and logs 260, 246, and 242 in detection computer 140 can be stored on one or more of the respective portable computer-readable tangible storage devices 936, read via the respective R/W drive or interface 832 and loaded into the respective hard drive 830.

Each set of internal components 800 a, b, c also includes network adapters or interfaces 836 such as a TCP/IP adapter cards, wireless wi-fi interface cards, or 3G or 4G wireless interface cards or other wired or wireless communication links. The programs 250, 252, 254, 256, 258, 264, and 266, and logs 260, 246, and 242 in detection computer 140 can be downloaded to detection computer 140 from an external computer via a network (for example, the Internet, a local area network or other, wide area network) and respective network adapters or interfaces 836. From the network adapters or interfaces 836, the programs 250, 252, 254, 256, 258, 264, and 266, and logs 260, 246, and 242 in detection computer 140 are loaded into the respective hard drive 830. The network may comprise copper wires, optical fibers, wireless transmission, routers, firewalls, switches, gateway computers and/or edge servers.

Each of the sets of external components 900 a, b, c can include a computer display monitor 920, a keyboard 930, and a computer mouse 934. External components 900 a, b, c can also include touch screens, virtual keyboards, touch pads, pointing devices, and other human interface devices. Each of the sets of internal components 800 a, b, c also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Aspects of the present invention have been described with respect to block diagrams and/or flowchart illustrations of methods, apparatus (system), and computer program products according to embodiments of the invention. It will be understood that each block of the flowchart illustrations and/or block diagrams, and combinations of blocks in the flowchart illustrations and/or block diagrams, can be implemented by computer instructions. These computer instructions may be provided to a processor of a general purpose computer, special purpose computer, or other programmable data processing apparatus to produce a machine, such that instructions, which execute via the processor of the computer or other programmable data processing apparatus, create means for implementing the functions/acts specified in the flowchart and/or block diagram block or blocks.

The aforementioned programs can be written in any combination of one or more programming languages, including low-level, high-level, object-oriented or non object-oriented languages, such as Java, Smalltalk, C, and C++. The program code may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN), or the connection may be made to an external computer (for example, through the Internet using an Internet service provider). Alternatively, the functions of the aforementioned programs can be implemented in whole or in part by computer circuits and other hardware (not shown).

Based on the foregoing, computer system, method and program product have been disclosed in accordance with the present invention. However, numerous modifications and substitutions can be made without deviating from the scope of the present invention. Therefore, the present invention has been disclosed by way of example and not limitation.

What is claimed is:

1. A method for determining whether a product has been successfully purchased at a check-out register, the method comprising the steps of:
    a computer identifying in a video record a suspected fakescan involving an instant product, the computer identifying the suspected fakescan based on a first movement of the instant product adjacent to a scanner and an approximate time at which the instant product was moved adjacent to the scanner, wherein the instant product can be any one product included in an overall transaction involving a plurality of products;
    the computer determining that the scanner did not record a purchase transaction within a predetermined time of the time at which the instant product was moved adjacent to the scanner as identified in the video record;
    the computer measuring a difference in time between the time of the first movement of the instant product adjacent to the scanner and a time representing a boundary of the overall transaction, wherein a transaction record includes a timestamp corresponding to the boundary of the overall transaction;
    the computer generating a first score representing, at least in part, the difference in time;
    the computer representing the first score in a multidimensional vector space including a model representing sets of scores corresponding to actual fakescans and sets of scores corresponding actual true scans within the multidimensional vector space; and
    the computer comparing the first score to the model, and in response, the computer making a binary determination whether the suspected fakescan corresponds to an actual fakescan based on the comparison of the first score to the model.

2. The method of claim 1, wherein the timestamp representing the boundary of the overall transaction represents a beginning of the overall transaction, and wherein the computer generates the first score in accordance with a heuristic rule that increases a value of the first score based on an increase in the difference in time between the beginning of the overall transaction and the time of the first movement of the instant product adjacent to the scanner, the value of the first score being inversely proportional to a likelihood that the suspected fakescan is an actual fakescan.

3. The method of claim 2, wherein the timestamp representing the beginning of the overall transaction represents a customer in possession of the instant product approaching a point of sale terminal including the scanner.

4. The method of claim 2, wherein the timestamp representing the beginning of the overall transaction represents a first recognized pick-up behavioral primitive performed by a person operating a point of sale terminal including the scanner.

5. The method of claim 2, wherein the first score is normalized by a duration of the overall transaction.

6. The method of claim 1, wherein the timestamp representing the boundary of the overall transaction represents an end of the overall transaction, and wherein the computer generates the first score in accordance with a heuristic rule that increases a value of the first score based on an increase in the difference in time between the time of the first movement of the instant product adjacent to the scanner and the end of the overall transaction, the value of the first score being inversely proportional to a likelihood that the suspected fakescan is an actual fakescan.

7. The method of claim 6, wherein the timestamp corresponding to the boundary of the overall transaction represents a customer in possession of the instant product walking away from a point of sale terminal including the scanner.

8. The method of claim 6, wherein the timestamp corresponding to the boundary of the overall transaction represents, with respect to the overall transaction, a last recognized drop-off behavioral primitive performed by a person operating a point of sale terminal including the scanner.

9. The method of claim 6, wherein the score is normalized by a duration of the overall transaction.

10. The method of claim 1, further comprising:
    the computer recognizing, in the video record of the suspected fakescan, an action as a behavioral primitive, and in response, the computer incrementing a count of behavioral primitives during the suspected fakescan that corresponds to a behavioral primitive type of the recognized action;
    the computer generating a second score representing, at least in part, the count of behavioral primitives;
    the computer representing an instant set of scores including the first score and the second score in the multidimensional vector space including the model representing the sets of scores corresponding to actual fakescans and the sets of scores corresponding actual trues scans within the multidimensional vector space; and
    the computer comparing the instant set of scores to the model, and in response, the computer making a binary determination whether the instant set of scores corresponds to an actual fakescan based on the comparison.

11. The method of claim 10, wherein the behavioral primitive of the recognized action is a pick-up behavioral primitive and the second score is a total count of pick-up behavioral primitives in the video record of the suspected fakescan, wherein the model is based on a heuristic rule that a value of the count of pick-up behavioral primitives is inversely proportional to a likelihood that a particular suspected fakescan is an actual fakescan.

12. The method of claim 10, wherein the behavioral primitive of the recognized action is a swipe behavioral primitive and the second score is a total count of swipe behavioral primitives in the video record of the suspected fakescan, wherein the model is based on a heuristic rule that a value of the count of swipe behavioral primitives is inversely proportional to a likelihood that a particular suspected fakescan is an actual fakescan.

13. The method of claim 10, wherein the behavioral primitive of the recognized action is a drop-off behavioral primitive and the second score is a total count of drop-off behavioral primitives in the video record of the suspected fakescan, wherein the model is based on a heuristic rule that a value of the count of drop-off behavioral primitives is inversely proportional to a likelihood that a particular suspected fakescan is an actual fakescan.

14. The method of claim 10, further comprising:
the computer identifying a total count of barcode signals in a record of the overall transaction;
the computer generating a third score representing, at least in part, the count of barcode signals;
the computer incorporating the third score into the instant set of scores such that the binary determination whether the instant set of scores corresponds to an actual fakescan is based, in part, on the third score, wherein the model is based on a heuristic rule that a value of the total count of barcode signals in the record of the overall transaction is proportional to a likelihood that a particular suspected fakescan is an actual fakescan.

15. The method of claim 10, further comprising:
the computer determining a confidence score corresponding to the binary determination whether the instant set of scores corresponds to an actual fakescan.

16. The method of claim 10, further comprising:
the computer identifying, within the video record, a plurality of suspected fakescans during the overall transactions;
the computer identifying, within the video record, each product involved in the plurality of suspected fakescans;
the computer, for each product involved in the plurality of suspected fakescans, making the binary determination whether the instant set of scores corresponds to an actual fakescan and determining respective confidence scores;
the computer ranking suspected fakescans determined to be actual fakescans based on the respective confidence scores; and
the computer displaying a ranked list of suspected fakescans based on the ranking of the respective confidence scores.

17. The method of claim 16, further comprising:
the computer reducing a count of suspected fakescans determined to be actual fakescans based on a threshold count of suspected fakescans ordered based on the respective confidence scores.

18. The method of claim 17, wherein the threshold count is a dynamic count based on a count of people capable of investigating suspected fakescans at an instant time.

* * * * *